(12) United States Patent
Kimura et al.

(10) Patent No.: US 7,577,452 B2
(45) Date of Patent: Aug. 18, 2009

(54) MOBILE TELEPHONE APPARATUS

(75) Inventors: Yasuhisa Kimura, Yokohama (JP); Koji Noda, Yokohama (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/497,402

(22) PCT Filed: Dec. 12, 2002

(86) PCT No.: PCT/JP02/13025

§ 371 (c)(1),
(2), (4) Date: Jun. 2, 2004

(87) PCT Pub. No.: WO03/052971

PCT Pub. Date: Jun. 26, 2003

(65) Prior Publication Data

US 2005/0014520 A1    Jan. 20, 2005

(30) Foreign Application Priority Data

Dec. 14, 2001    (JP) .............................. 2001-381665

(51) Int. Cl.
H04B 15/00     (2006.01)
H04B 7/005     (2006.01)
H04B 7/01      (2006.01)
H04B 7/015     (2006.01)

(52) U.S. Cl. ................. 455/502; 455/279.1; 455/575.7; 370/350

(58) Field of Classification Search .................... 455/82, 455/83, 560, 562.1, 101, 272, 277.1, 277.2, 455/279.1, 450, 452.1, 452.2, 502, 575.7; 375/299, 347; 370/350

See application file for complete search history.

(56) References Cited

U.S. PATENT DOCUMENTS 6,032,033 A * 2/2000 Morris et al. ............ 455/277.2
6,272,335 B1 * 8/2001 Nakayama et al. ....... 455/422.1
6,556,559 B1 * 4/2003 Mitsume et al. ............. 370/350
6,560,443 B1 * 5/2003 Vaisanen et al. .............. 455/73
6,766,146 B1 * 7/2004 Park et al. ..................... 455/69
6,799,026 B1 * 9/2004 Scherzer et al. .......... 455/279.1
6,862,431 B2 * 3/2005 Richter .................... 455/67.11
2002/0077142 A1 * 6/2002 Sato et al. .................... 455/525

FOREIGN PATENT DOCUMENTS

| JP | 4-68720   | 3/1992  |
| JP | 4-282922  | 10/1992 |
| JP | 5-252094  | 9/1993  |
| JP | 7-250013  | 9/1995  |
| JP | 9-247063  | 9/1997  |
| JP | 9-307489  | 11/1997 |
| JP | 9-321678  | 12/1997 |
| JP | 10-303793 | 11/1998 |
| JP | 11-191750 | 7/1999  |

* cited by examiner

*Primary Examiner*—Nay A Maung
*Assistant Examiner*—Tuan H Nguyen
(74) *Attorney, Agent, or Firm*—Pearne & Gordon LLP

(57) ABSTRACT

The invention provides a cell phone which shows good receiving sensitivity even in a state where synchronization with a base station is not provided, such as power-on and detection of a dead space.

The invention alternately switches between a plurality of antennas a predetermined number of times per fixed time predetermined in accordance with the number of perch channels in a state where synchronization with a base station is not provided, and sets an antenna whose mean value of the receiving level of each of these antennas is the highest as an antenna to be used subsequently, that is, an antenna to open a control channel.

3 Claims, 3 Drawing Sheets

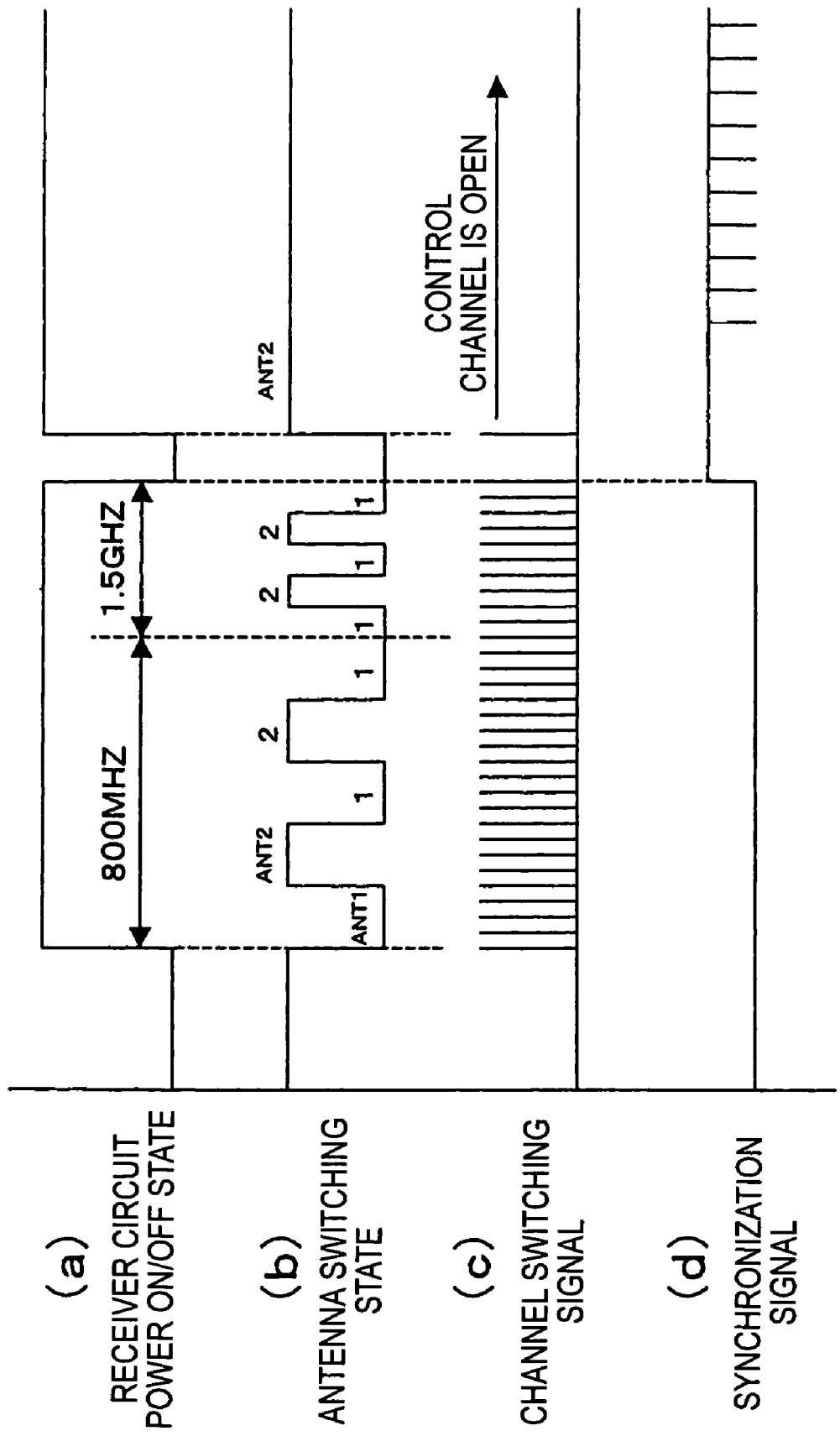

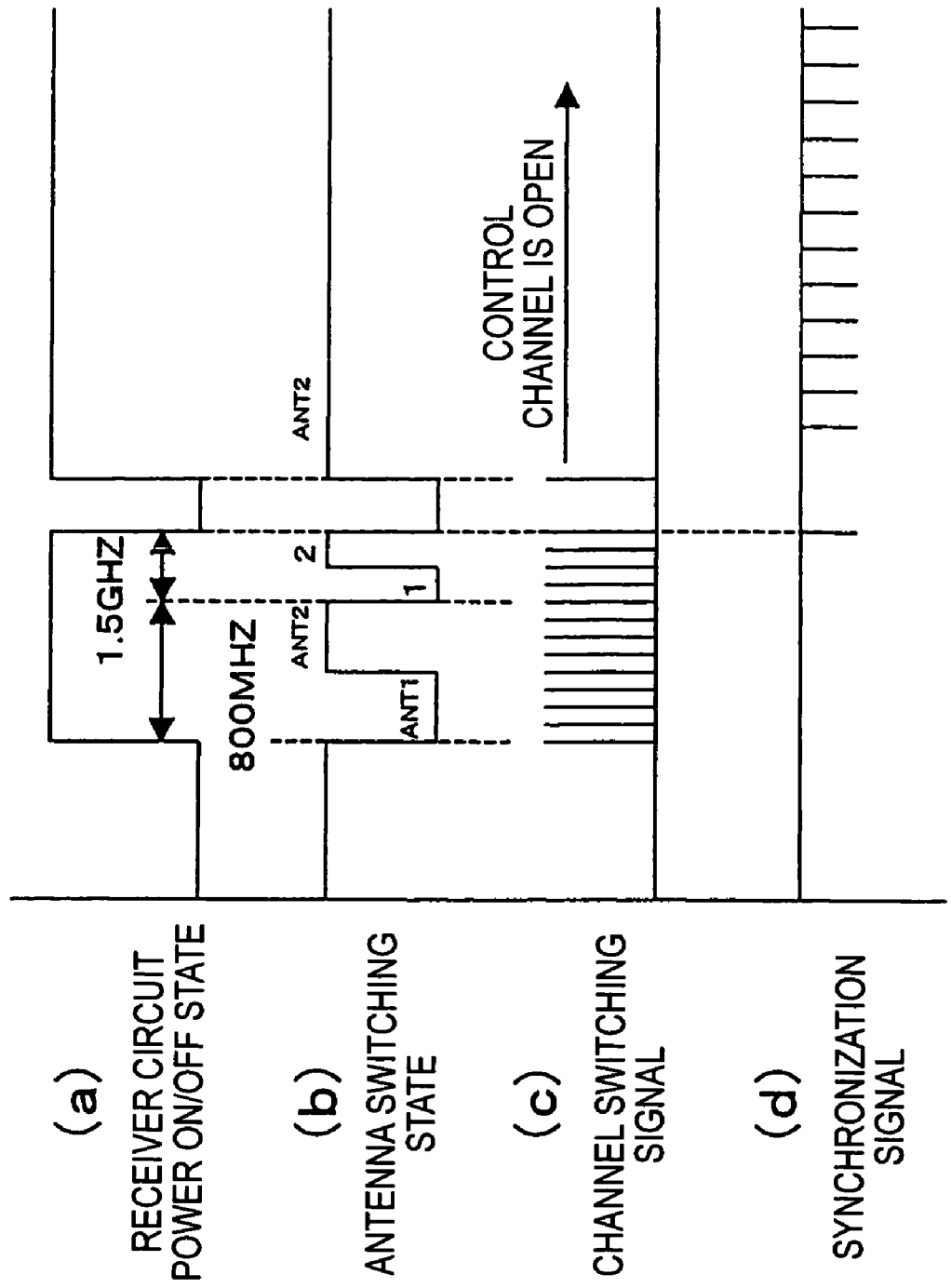

MOBILE TELEPHONE APPARATUS

Technical Field

The present invention relates to a cell phone equipped with so-called a diversity antenna comprising at least two antennas switched according to the receiving sensitivity.

Background of the Invention

In general, a cell phone equipped with a diversity antenna is known. These cell phones use one of the predetermined antennas at power-on or in a dead space where a receiving level has dropped below a predetermined value. That is, in a state where the cell phone is not synchronized with a radio wave from a base station, the cell phone uses an either antenna predetermined, for example a whip antenna which is known to generally excel in receiving sensitivity in case the whip antenna and a built-in antenna are provided, to receive a radio wave from the base station, and causes two antennas as a diversity antenna when synchronization is provided.

Such a cell phone uses a whip antenna in a state where synchronization is not provided based on the idea that the whip antenna excels in receiving sensitivity in normal use. In recent years, a cell phone is getting smaller and has a lower profile, so that an either predetermined antenna does not necessary excel in receiving sensitivity depending on the use condition and use environment of the cell phone. Accordingly, using a predetermined antenna in any case provides lower receiving sensitivity.

The invention solves the aforementioned related art problems and aims as providing a cell phone which alternately uses a plurality of antennas to provide diversity reception even in a state where synchronization is not provided, for example at power-on and in a dead space.

DISCLOSURE OF THE INVENTION

To attain the object, the invention provides a cell phone comprising switching means for alternately switching between a plurality of antennas a predetermined number of times per predetermined fixed time in a state where synchronization with a base station is not provided, characterized in that the cell phone selects an antenna whose sum of the receiving levels is the highest among the antennas selected by the switching means, and selects a channel whose receiving level is the highest, while in a state where synchronization with a base station is provided, alternately switches between the antennas with a predetermined timing in synchronization with the selected channel, detects a receiving level in the state, and uses an antenna whose receiving level is the highest.

With this configuration, even in a state where synchronization with a base station is not provided, it is possible to effectively use a plurality of antennas as a diversity antenna.

The cell phone of the invention is characterized in that, in a state where synchronization with the base station is not provided at power-on, the predetermined fixed time is sufficiently longer than the period where the switching means alternately switches between the antennas in a state where synchronization with the base station is provided.

With this configuration, it is possible to select an antenna whose receiving sensitivity is excellent without delay and set a receiving channel correctly.

The cell phone of the invention is characterized in that, in a state where synchronization with the base station is not provided on detection of a dead space, the predetermined fixed time is sufficiently longer than the period where the switching means alternately switches between the antennas in a state where synchronization with the base station is provided.

With this configuration, it is possible to detect the receiving levels of all channels that can be received on detection of a dead space and set a receiving channel accordingly. This automatically selects an antenna whose receiving level is the highest, thereby practically reducing the range of dead space.

BRIEF DESCRIPTION OF THE DRAWINGS

FIG. 2 is a time chart illustrating the operation at power-on of a cell phone according to an embodiment of the invention; and FIG. 3 is a time chart illustrating the operation on detection of a dead space of a cell phone according to an embodiment of the invention.

Figure 1:
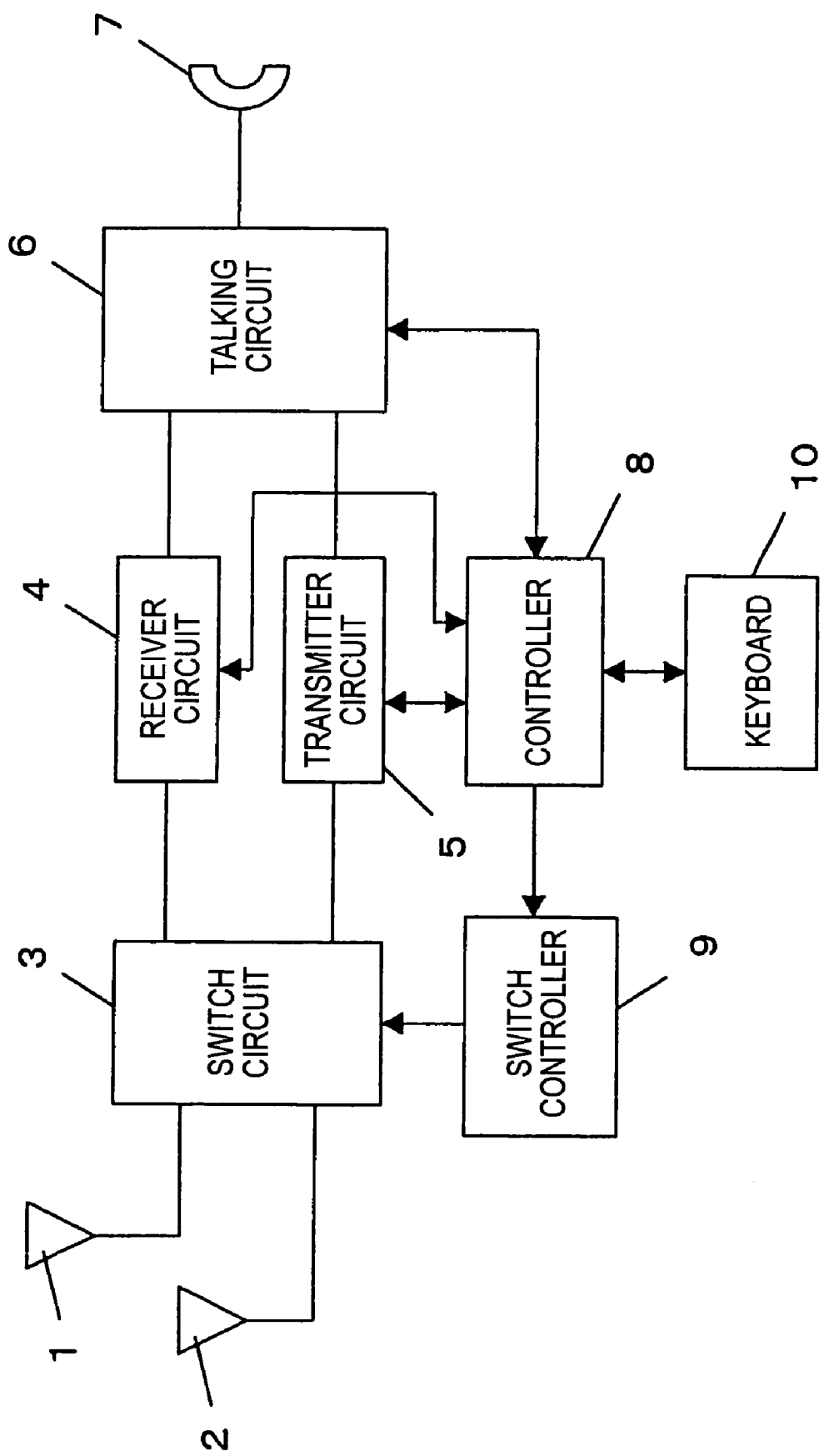
FIG. 1 is a general block diagram of a cell phone according to an embodiment of the invention.

In the figures, a numeral 1 represents a first antenna, 2 a second antenna, 3 a switch circuit, 4 a receiver circuit, 5 a transmitter circuit, 6 a talking circuit, 7 a handset, 8 a controller, 9 a switch controller, and 10 a keyboard.

BEST MODE FOR CARRYING OUT THE INVENTION

An embodiment of the invention is described below referring to the drawings.

FIG. 1 is a general block diagram of a cell phone according to an embodiment of the invention.

In FIG. 1, a first antenna 1 is for example a whip antenna and is attached for example to the enclosure of a main unit of a clamshell-type cell phone having a keyboard so as to allow housing of the first antenna. A first antenna 2 is for example a frame antenna of an inverted F shape and housed in the enclosure of the lid section having a liquid crystal display, etc.

A switch circuit 3 alternately places the first and the second antennas 1, 2 in an available state. Receive signals from the first and the second antennas 1, 2 are respectively supplied to a receiver circuit 4. A send signal from a transmitter circuit 5 is supplied to the first and the second antennas 1, 2 via the switch circuit 3.

The talking circuit 6 supplies a signal from the receiver circuit 4 to the handset 7 and supplies a signal from the handset 7 to the transmitter circuit 5. A controller 8 receives a control signal from a keyboard 10 to control the receiver circuit 4 and the transmitter circuit 5, and receives a receiving level signal from the receiver circuit 4 to control the switch controller 9.

Next, the operation of this embodiment is detailed below referring to FIGS. 2 and 3.

As shown in (a) of FIG. 2, when the power is turned on, at that point in time, the controller 8 outputs a predetermined control signal to the switch controller 9 so that the switch circuit 3 will control alternate switching between the first and the second antennas 1, 2. The switch circuit 3, as shown in (b) of FIG. 2, alternately switches between the first and the second antennas 1, 2 per predetermined fixed time.

While the predetermined fixed time may be a fixed predetermined fixed time, it is set as follows in accordance with the number of perch channels in this embodiment. Assuming that the time required for detection per channel is t and the number of perch channels is n, the predetermined fixed time T is determined using the expression T=t×n.

For example, in case the time t required for detection per channel is 2.4 msec and the number of perch channels n is 20 in communications in the 800-MHz band, the predetermined fixed time T is set to 2.4×20=48 msec. In case the number of perch channels n is 10 in communications in the 1500-MHz band, the predetermined fixed time T is set to 2.4×10=24 msec.

The antennas 1, 2 are alternately switched a plurality of times (for example five times) for each band. To be more precise, control is made to switch between the antennas for example five times: the first antenna 1 for a first 48 msec, the second antenna 2 for a second 48 msec, the first antenna 1 for a third 48 msec, and so on; then five times: the first antenna 1 for a first 24 msec, the second antenna 2 for a second 24 msec, the first antenna 2 for a third 24 msec, and so on.

In this way, the first and the second antennas 1, 2 are switched per predetermined fixed time and radio waves from respective base stations of the channels are received, as shown in (c) of FIG. 2. The signal received is input to the controller 8 via the receiver circuit 4, where the receiving levels are summed up for each of the first and the second antennas 1, 2, and as a result, the antenna whose mean value of the receiving level is the larger (for example the second antenna as shown in (b) of FIG. 2) is determined as an antenna to be used subsequently, that is, an antenna to open a control channel. Information on the determined antenna is supplied to the switch controller 9. The switch controller 9 makes control so that the switch circuit will place the determined antenna in the operating state.

The channel which has received the highest signal level is set as a channel to be used thereafter. The controller 8 operates in synchronization with the channel. In other words, while the switch circuit 3 is alternately switching between the first and the second antennas 1, 2 as shown in FIG. 2D, the switch circuit 3 is not operating in synchronization with any channel. When the period has elapsed, the controller 8 enters the synchronous operation based on the received signal. Once a channel which has received the largest signal level is set, the controller 8 operates in synchronization with the channel.

While the controller 8 is synchronized with the channel whose receiving level is the highest, the power supply for the receiver circuit 4, transmitter circuit 5 and talking circuit 6 is intermittently turned ON and OFF in accordance with the synchronization signal in order to save battery power in the standby state (not shown). Thus, the ON period of the intermittent ON/OFF sequence is used to control the switch control circuit 9 and cause the switch circuit 3 to alternately switch between the first and the second antennas 1, 2 while detecting the receiving level in that state and selecting an antenna which has received the higher receiving level. This state assumes that the receiver circuit 4 is synchronized with the channel whose receiving level is the highest. Thus, the time allowed to detect the receiving level is a very short time in the ON period of the intermittent ON/OFF sequence and the receiving levels are detected and compared with each other on the set channel alone.

A case will be described where the receiving level has dropped below a predetermined value, that is, the cell phone has entered a dead space while control is made to switch between the first and the second antennas 1, 2 and a signal is received using an antenna whose receiving level is the higher.

In this case, on detecting that the cell phone has entered the dead space, the controller 8 automatically makes control to turn on the power supply for the receiver circuit 4 for a predetermined time, as shown in (a) of FIG. 3. At the same time, the controller 8 issues an instruction to the switch controller 9 to make control so as to cause the switch circuit 3 to alternately place the first and the second antennas 1, 2, as shown in (b) of FIG. 3. The period when the switch circuit alternately places the first and the second antennas 1, 2 depends on the fixed time determined by the number of perch channels, same as the earlier case where the power is turned on. In this case, however, unlike power on, the number of perch channels has not been permanently registered. Thus, the number of channels differs depending on an area as a dead space and the fixed time varies accordingly. In this case, the antennas are alternatively selected only once.

In this way, switching is made between the first and the second antennas 1, 2 to place either in the operating state, and receiving level of each channel is detected in this state, then the receiving levels are summed up for each of the first and the second antennas 1, 2 and the antenna whose mean value of the receiving level is the larger is set as an antenna to be used subsequently. The channel whose receiving level is the highest is set as a receiving channel anew, and control is made to synchronize with the new channel.

According to this embodiment, the first and the second antennas are alternately placed in the operating state per predetermined fixed time at power-on or on detection of a dead space. In this state, the receiving level of each channel is detected and the channel whose receiving level is the highest is set as a receiving channel. At the same time, the antenna whose sum of the receiving levels is the highest is set as an antenna to be used subsequently, that is, an antenna to open a control channel. This always selects an antenna with the higher receiving sensitivity without delay irrespective of the use condition and use environment of the cell phone.

In particular, the predetermined fixed time is a fixed time determined in accordance with the number of perch channels. The fixed time is sufficiently longer than the fixed time for switching between the first and the second antennas in standby state operating intermittently. Thus, it is possible to detect the receiving level of each of the plurality of channels and set a channel whose receiving level is the highest as a receiving channel appropriately. As a result, the embodiment is advantageous in that, a receiving channel is subsequently set appropriately even in intermittent operation, and the signal on the channel can be received in synchronization with the receiving channel.

While the invention has been detailed with reference to its specific embodiment, those skilled in the art will recognize that various changes and modifications can be made in it without departing from the spirit and scope thereof.

This application is based on the Japanese Patent Application No. 2001-381665 filed Dec. 14, 2001, the disclosure of which is incorporated herein by reference.

INDUSTRIAL APPLICABILITY

As mentioned hereabove, according to the invention, the first and the second antennas are alternately selected per predetermined fixed time in a state where synchronization is not provided, such as power-on and detection of a dead space, and the mean value of the receiving level of each of the first and the second antennas is detected. Then, the antenna whose mean value of the receiving level is the larger is determined as an antenna to be used subsequently. It is thus possible to automatically use an antenna whose receiving level is the higher even in a state where synchronization is not provided, such as power-on and detection of a dead space, which is very useful in providing synchronization.

The invention claimed is:

1. A cell phone comprising:
a first antenna that receives radio waves from a base station;
a second antenna that receives radio waves from the base station;

a receiving circuit that acquires receiving levels of channels via the antennas;

a switch circuit that switches the antennas; and a controller for selecting the channel that has the highest receiving level and that controls switching the antennas before selecting one of the antennas, wherein, when synchronization with the base station is not provided, the controller alternately switches the antennas a predetermined number of times during a predetermined fixed time that is calculated by the controller based on a total number of perch channels and a perch channel detection time, such that the switching is not in synchronization with any channel received from the base station, and wherein the controller alternately switches between the antennas with a predetermined timing in synchronization with the selected channel when synchronization with the base station is provided.

2. The cell phone according to claim 1, wherein, in a state where synchronization with the base station is not provided at power-on, said predetermined fixed time is sufficiently longer than the period where said controller alternately switches between the antennas in a state where synchronization with the base station is provided.

3. The cell phone according to claim 1, wherein, in a state where synchronization with the base station is not provided on detection of a dead space, said predetermined fixed time is sufficiently longer than the period where said controller alternately switches between the antennas in a state where synchronization with the base station is provided.

* * * * *